May 27, 1924. 1,495,959
V. T. MAVITY
COIL FORMING APPARATUS
Filed Oct. 17, 1922   5 Sheets-Sheet 2
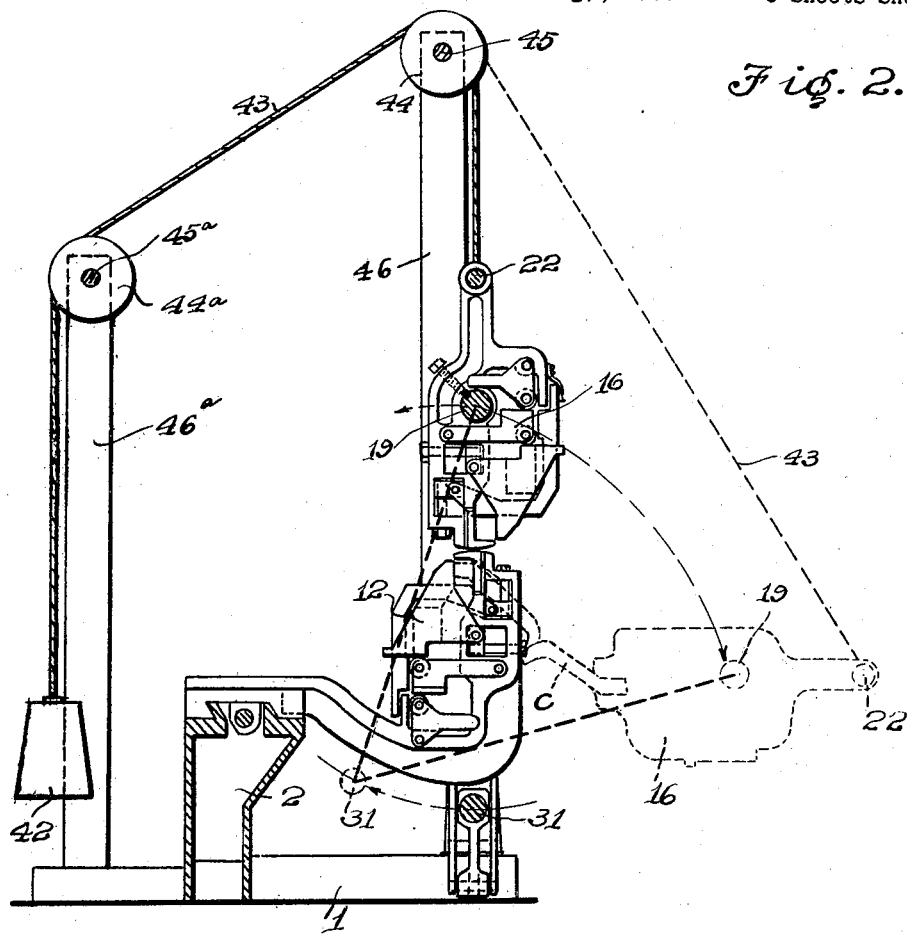
Fig. 2.
Fig. 3.
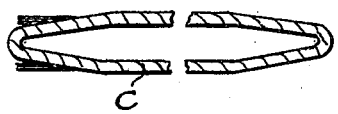
Fig. 4.
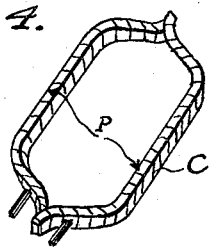
Victor T. Mavity
Inventor
By Harry Cohen
Attorney

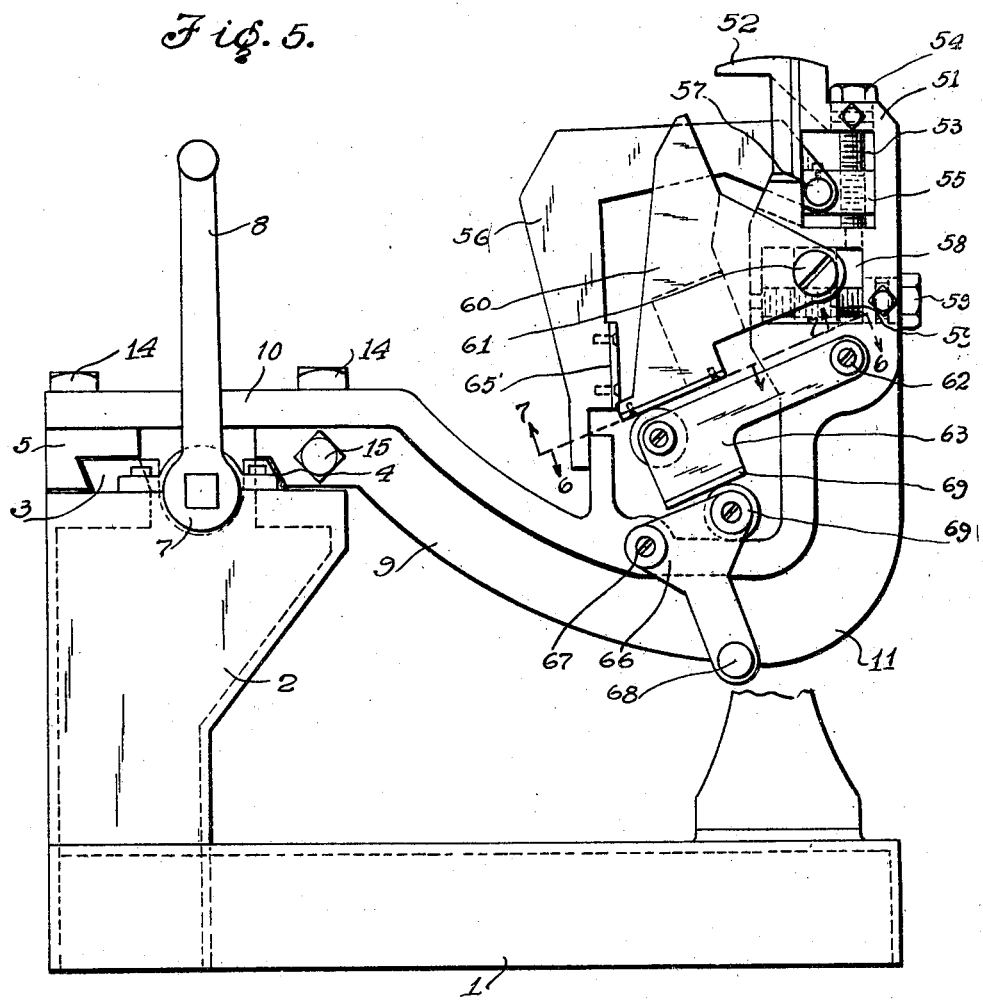
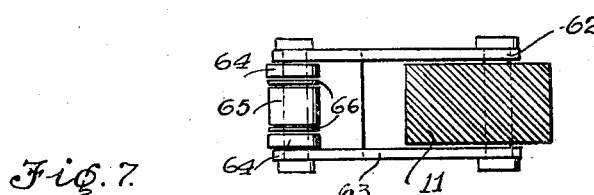
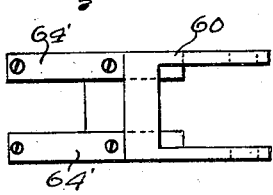

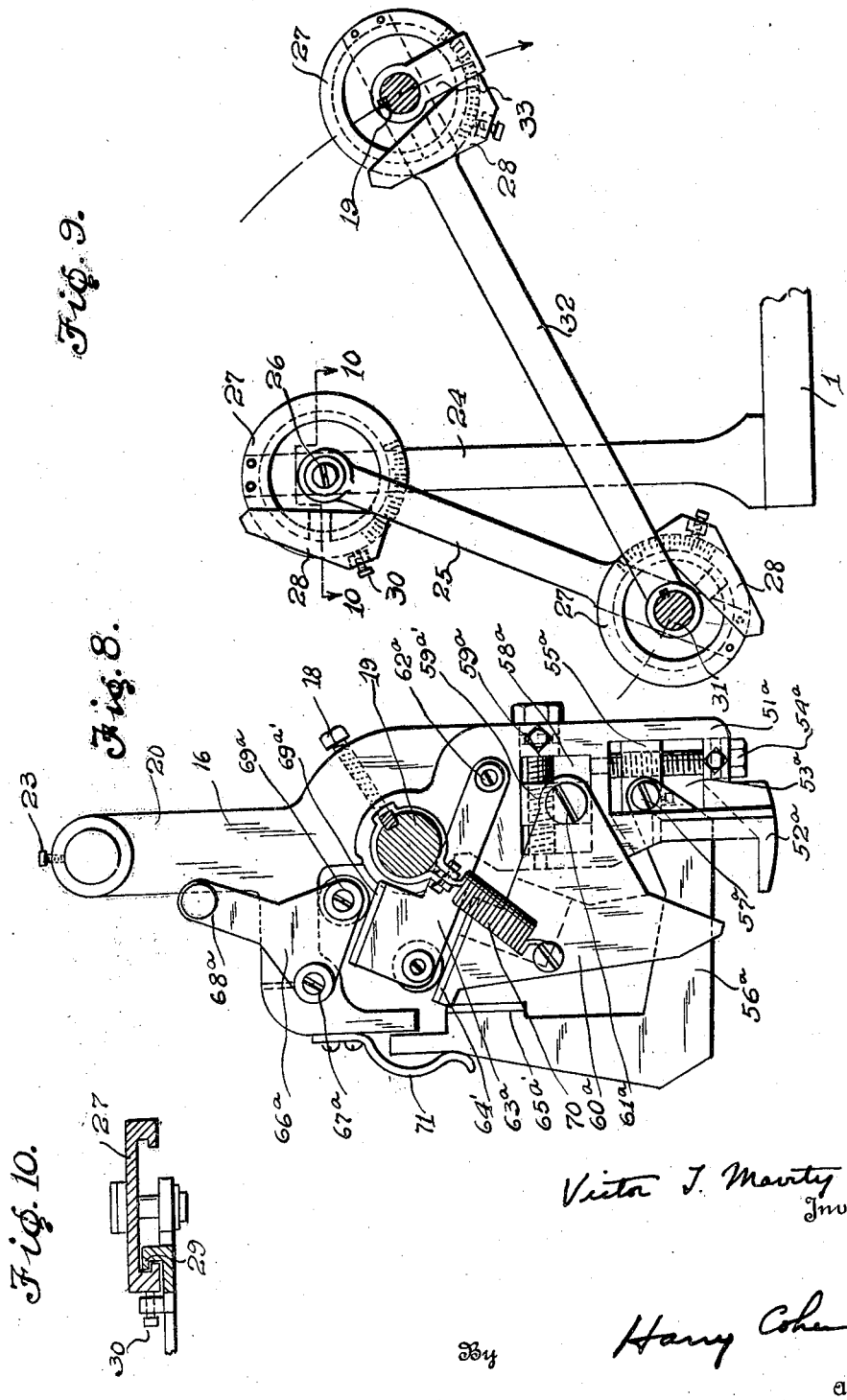

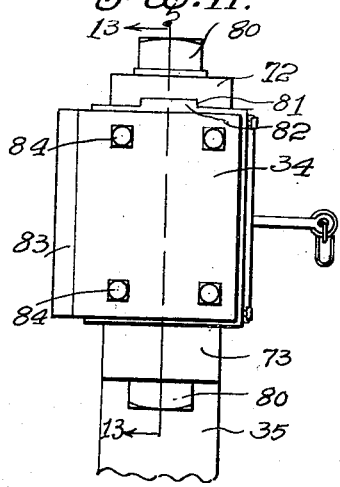
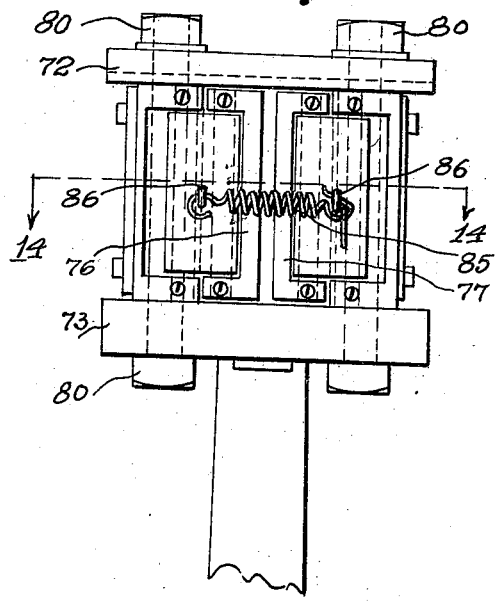
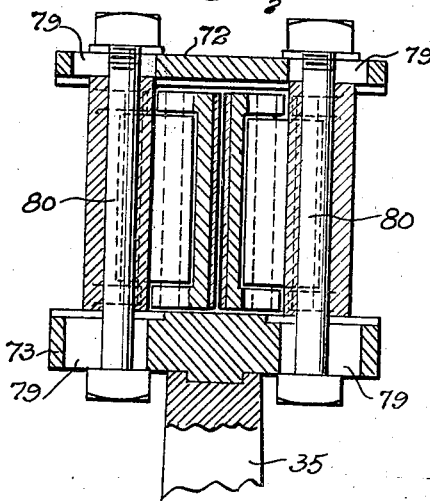
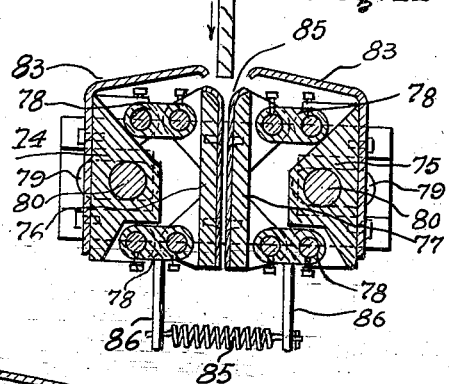
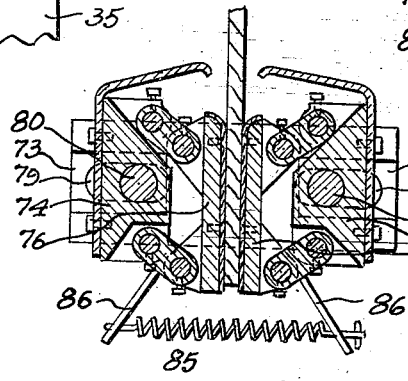

Patented May 27, 1924.

1,495,959

UNITED STATES PATENT OFFICE.

VICTOR T. MAVITY, OF CHAPARRA, CUBA.

COIL-FORMING APPARATUS.

Application filed October 17, 1922. Serial No. 595,109.

*To all whom it may concern:*

Be it known that I, VICTOR T. MAVITY, a citizen of the United States, residing in Chaparra, Oriente, Cuba, have invented certain new and useful Improvements in Coil-Forming Apparatus, of which the following is a specification.

This invention relates to a machine for forming coils that have previously been wound into elongated loops so that they will fit into the proper slots of dynamo-electric machines, and the primary purpose of the invention is to provide a machine that may be very rapidly operated and at the same time form any number of successive duplicate coil blanks of exactly the same form and dimensions.

The main object of the invention is attained by the machine hereinafter described which is adjustable in a very expedient manner so that a great many coils of different sizes or dimensions may be formed by a simple adjustment of certain parts of the mechanisms that constitute the machine.

The coil former includes novel jaws and clamps and certain mechanisms associated therewith whereby the machine is readily adjustable and operates very quickly and accurately.

The main object of the invention and other objects that might hereinafter appear will be clearly understood from the following description and the accompanying drawings in which:

Fig. 2 is a sectional view on the line 2—2 of Fig. 1;

Fig. 3 is a view of the elongated coil before it is formed to fit the dynamo-electric machine;

Fig. 4 is a view of the coil after it is formed by the machine comprising this invention;

Fig. 5 is an end view of the lower jaw of the machine and the base to which it is connected;

Fig. 6 is a plan view of the jaw closing arms taken on the line 6—6 of Fig. 5;

Fig. 7 is bottom plan view of the pivoted jaw side taken on the line 7—7 of Fig. 5;

Fig. 8 is an end view of the upper jaw of the machine;

Fig. 9 is a view of the supporting arm, radius arm and pitch arm, and also of the stop members, in their relative position at the end of the coil forming operation;

Fig. 10 is a sectional view of a stop member taken on the line 10—10 of Fig. 9;

Fig. 11 is a side view of the novel clamp;

Fig. 12 is an end view of the clamp;

Fig. 13 is a sectional view of the clamp on the line 13—13 of Fig. 11;

Fig. 14 is a sectional view of the clamp on the line 14—14 of Fig. 12;

Fig. 15 is a view similar to Fig. 14 and shows how the parts of the clamp grip the end of the coil; and Fig. 16 is a side view of the clamp pivotally mounted in its support.

Figure 1:
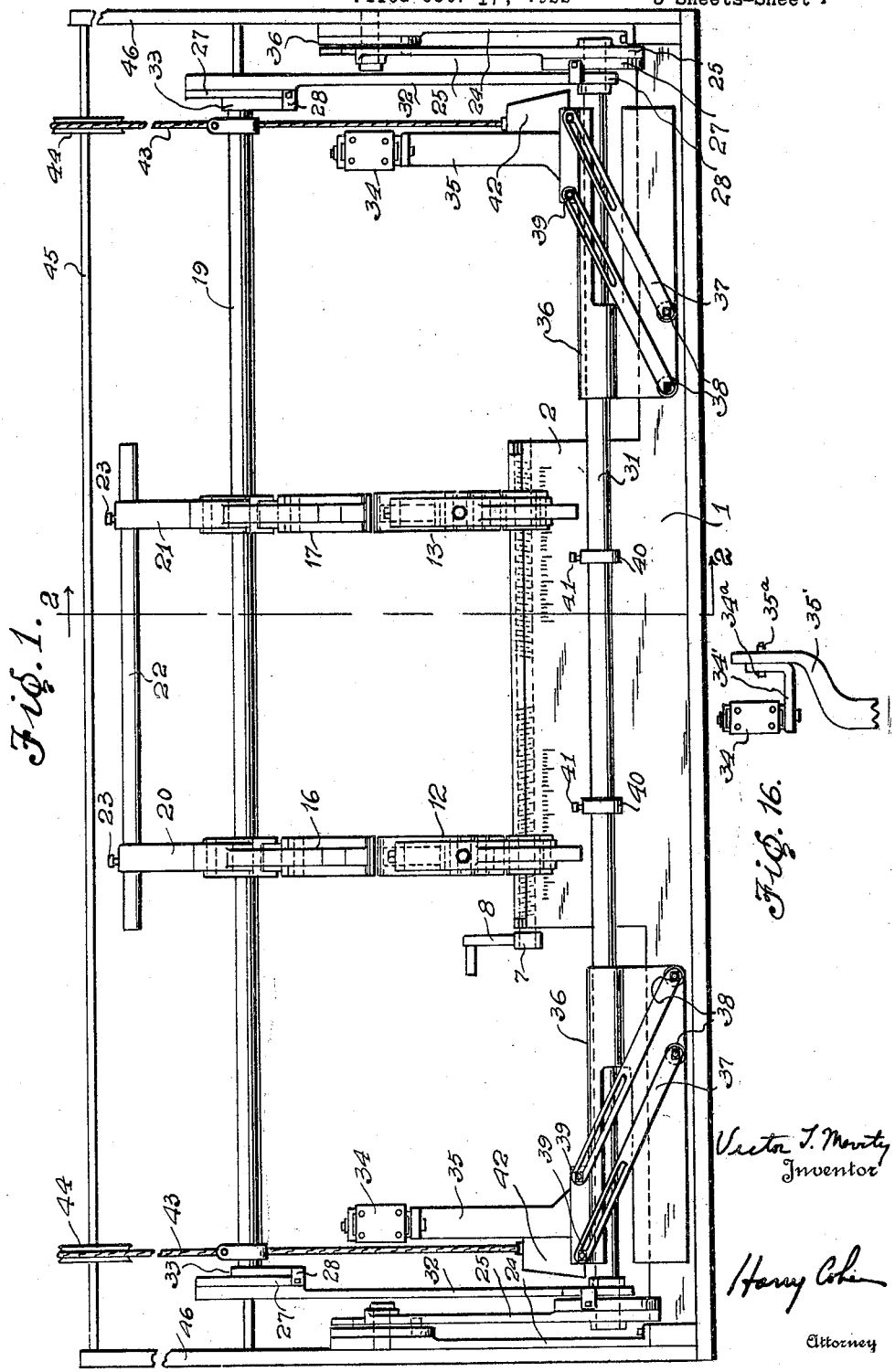
Figure 1 is a front elevation of the coil forming apparatus.

Referring to the drawings, the numeral 1 designates the base of the machine having the upstanding block 2 provided with the upstanding tapered projections 3 and 4, as shown more clearly by Fig. 5, which act as a guide for the jaw adjusting nuts 5 which are in screw threaded engagement with the jaw spacing screw 7 which is pivotally mounted in the block 2. Secured to the jaw adjusting nuts 5 are the parts 9 and 10 of the lower jaw body 11 of each of the lower jaws 12 and 13. The parts 10 of the lower jaws are secured to the nuts 5 by means of the bolts 14 and the parts 9 of the jaws are secured to the same nuts by the bolts 15 and it will be readily understood that there are two adjusting nuts 5, one for the jaw 12 and the other for the jaw 13. As shown by Fig. 1, the jaw spacing screw is provided with oppositely threaded portions that cooperate with the nuts 5 so that by a single operation the jaws 12 and 13 are moved from or toward each other. The screw 7 is provided with the operating handle 8 to facilitate its manipulation.

Upper jaws 16 and 17 are also provided and are adjustably secured by means of set screws 18, for example, to the shaft 19, and are provided with upper projections 20 and 21 which are slidably mounted on an operating shaft 22. The construction of the upper jaws is shown more clearly by Fig. 8 and will be described in detail in connection with the detailed description of the lower jaws 12 and 13. The projections 20 and 21 of the upper jaws may also be provided with set screws 23 whereby the operating shaft 22 may be secured relatively to the projections. To space the lower jaws, it is necessary only to rotate the screw 7 by means of the handle 8 in the desired direction to increase or decrease the distance between the jaws. To space the upper jaws, it is necessary only to loosen the set screws 18 and 23 and then slide the upper jaws 16 and 17 toward or away from each other until they are spaced the same distance apart as the lower jaws, after which the set screws are again tightened. The front of the block 2 may be provided with graduations whereby the adjustment of the lower jaws may be quickly and accurately made.

Fixed to the base 1 at the ends thereof are the upright supporting arms 24 and near the top of each of the arms 24 is journalled an arm 25 hereinafter called a radius arm. The radius arms 25 are pivotally mounted on pins 26 received in holes provided near the top of the supporting arms 24. It will be obvious that the hole in the supporting arm 24 may be threaded to receive the threaded end of the pin 26 to constitute a convenient means for securing the pin 26 to the supporting arm 24 to form a bearing for the radius arm 25. Secured to the supports 24 are the stop members which limit the movement of the radius arms 25. Each stop member comprises a channeled ring member 27 and a stop 28 which fits over the periphery of the ring 27 and has a lug portion 29 which fits into the channel of the ring, the stop being secured in place by the set screw 30, and the ring being provided with graduations for convenience in positioning the stop. The construction of the stop member is shown more clearly by Fig. 10.

Rotatably mounted in the bottom of the radius arms 25 is a shaft 31 to which are keyed the pitch arms 32 at the top of which is rotatably mounted the shaft 19. Secured to the bottoms of the radius arms 25 are the stop members comprising the ring 27 and stop 28 as previously described in connection with the stop members secured to the supporting arms 24, and fixed to the pitch arms 32 near the tops thereof are another set of stop members similarly constructed. Cooperating with these last mentioned stop members are arms 33 which are keyed to the shaft 19. It will be apparent that the stops limit the rotation of the jaw shaft 19, the lower shaft 31 and the radius arms 25 and with the stops once properly adjusted, all coils of a set will be formed exactly the same.

The mechanism just described will be sufficient to open the coil from its elongated form and it will be understood from the previous description that in order to open the coil, the operator grips the shaft 22 and pulls it in the direction and to the position shown in dotted lines by Fig. 2, this figure also showing the coil C in position between the upper and lower jaws. It will be apparent that the stop members will limit the amount of opening or pitch of the coils, the pitch being represented by the letter P on Fig. 4 showing the finished coil.

However, in order to fit a plurality of coils in a dynamo-electric machine, it is necessary to offset the ends of the coil so that they will clear the ends of other coils when they are assembled, as is understood by those familiar with electric machines. In order to properly offset the coil ends, I have provided a novel form of clamp and an operating means therefor and have associated the clamps and the clamp operating means so that the coil will be opened to give it the required pitch and the ends offset in one and the same operation. The clamps will be described first in their general relation to the other structure of the machine and will later be described in detail.

Referring first to Fig. 1, the numerals 34 designate the clamps mounted on standards 35 which rest on the bases 36 which are slidably and pivotally mounted on the shaft 31. The bases 36 are heavy enough to act as counterweights for the purpose to be later described. Pivotally connecting the standards 35 to the bases 36 are the plurality of slotted links 37 pivoted to the bases at 38 and adjustably connected to the standards 35 by the pins 39 which pass through the bottom part of the standards and are rigidly connected to the slotted links by suitable clamping nuts. It will be obvious that slotted links 37 are provided on each side of the shaft 31 and are connected to opposite sides of the standards 35 and the bases 36. The general operation of the clamp moving means will be readily understood. Due to the opening of the coil, its length will be decreased and consequently the clamps 34 which grip the ends of the coil will be moved toward each other as the coil is opened, and due to the connection of the standards 35 to which the clamps are secured with the slotted links 37, the inward movement of the standards 35 causes their upward movement and the ends of the coils are consequently offset as will be apparent. To limit the inward movement of the clamps 34, there are provided the stop collars 40 which are secured in predetermined position by the set screws 41. The offsetting just described is for stator coils and may be referred to as a positive offset or "kick up," while for rotor coils, the offset or "kick up" must be negative by comparison and is obtained by setting the upper pins 39 so that when the links or levers 37 are vertical, the distance between the base 36 and the standard 35 is equal to the negative offset or "kick up." Then the coil ends are fastened in the clamps when the levers 37 are in a vertical position so that the clamps and the standards are forced downward as the coil is opened. In Fig. 16, I have shown an alternative means for mounting the clamps on the standard 35' provided with a bearing 35ª which receives a pin 34ª rotatably mounted therein and to which is secured the support 34' for the clamp 34 which is the same as the clamp previously described. It is thus seen that by mounting the clamp as just described, it is rotatable about an axis parallel to the lower shaft and which passes through the center of the end clamp. The clamp may be secured at an angle to the standard and an angular offset up to a maximum of ninety degrees may be obtained.

As hereinbefore stated, the bases 36 are heavy enough to constitute counterweights and these counterweights are preferably heavy enough to return the standards 35 to a vertical position when the end clamps 34 are released from the coil. Counterweights 42 are suspended from ropes 43 connected to the jaw shaft 19 and passing over pulleys 44 and 44ª mounted on shafts 45 and 45ª journalled in uprights 46 and 46ª. Besides the counterweights just described, other counterweights may be provided. For instance, on each end of the lower shaft 31 there may be provided an arm to which will be connected or on which will be mounted a counterweight heavy enough to cause the pitch arms to assume a vertical position when the operating or pulling shaft 22 is released. Also, the radius arms may be extended and provided with counterweights to nearly balance all the weight on the pin 26 which will include the upper jaws, the "kick up" mechanism and couterweights, and the counterweights on the shaft 31 just mentioned.

The operation of the machine will be understood from the description. The stops are first adjusted, then the jaws are properly spaced, the offsetting mechanism is next adjusted, including the securing in proper position in the slots of the levers 37 of the pins 39 to obtain the desired degree of "kick up" and the stop collars are secured in position, and then the coil of elongated form is placed so that its sides are gripped by the upper and lower jaws and its ends by the clamps, after which the shaft is pulled to move the upper jaws with respect to the lower jaws, as represented by Fig. 2, until the arms of the machine touch the stop members. By the simple operation of pulling the shaft 22, both the proper pitch and end offsetting is given to the coils, and when the coil is formed, it is certain that successive coils will be formed exactly like the first coil until the mechanisms are adjusted for coils of different dimensions.

As part of my invention, I have provided a new and advantageous jaw mechanism and a new and highly desirable quick acting clamp and both mechanisms will now be described in detail. First, referring to the jaw mechanism the construction of the lower jaw is shown more clearly by Fig. 5, and the construction of the upper jaw, which is very much like the lower jaw, is shown more clearly by Fig. 8. This lower jaw has, as previously described, a lower portion 11 having integral therewith the part 9 and the part 10 whereby the jaw is securely supported by the spacing nut 5. The portion 11 is projected upwards as shown and has a head portion 51 terminating in the coil gripping portion 52. The head 51 is provided with a recess 53 into which is extended a screw 54 rotatably movable but longitudinally inmovable and in screw threaded engagement with the screw is an adjusting block 55 to which is pivotally connected the jaw bottom 56 at 57. In the jaw head 51, below the recess 53, there is provided another recess 58 into which extends the screw 59, rotatably movable but longitudinally immovable, on which is threaded the adjusting block 59' to which is pivotally connected the jaw side 60 by the pin 61. Pivotally connected to the jaw head at 62 is the jaw closing member 63 provided with rollers 64 and an intermediate roller 65 spaced from the rollers 64 by washers 66. The rollers 64 bear on the wear plates 64' secured to the under side of the jaw side 60 and the roller 65 bears on the wear plate 65' secured to the jaw bottom 56. It will be understood that the wear plates 64' are on each side of the intermediate roller 65 which contacts only with the wear plate 65' on the jaw bottom 56. To actuate the jaw closing member 63, there is provided the operating lever 66 pivoted to the jaw lower portion 11 at 67 and provided with the handle 68 for convenience and rapidity of operation. The outer end of the operating lever 66 has a roller 69 mounted therein for rolling bearing on the wear plate 69' fixed to the under side of the jaw closing member 63. The operation of the jaw mechanism just described will be obvious. Fig. 5 shows the jaw in open position. To close the jaw, the lever 66 is turned on its pivot 67, the roller 69 bearing on the wear plate 69' and thereby moving the jaw closing member 63 about its pivot 62, the two rollers 64 of this jaw closing member 63 bearing on the wear plates 64' and thereby lifting the jaw side member 60, and subsequently the roller 65 contacts with the wear plate 65' on the jaw bottom member 56, the movable side and bottom jaw members being thus actuated to properly grip and hold the coil on all sides. To adjust the jaw mechanism for a wider or narrower coil, the adjusting block 59' is operated by the screw 59, and to provide for a deeper or shallower slot, the adjusting block 55 is operated by the screw 54.

The upper jaws of the machines are constructed like the lower ones, as previously stated, and the several parts comprise the jaw head 51ᵃ having the recess 53ᵃ into which extends the screw 54ᵃ bearing the adjusting block 55ᵃ to which is pivoted at 57ᵃ the jaw bottom member 56ᵃ. The jaw head 51ᵃ is provided with the coil gripping portion 52ᵃ. Above the recess 53ᵃ, there is a recess 58ᵃ into which extends the screw 59ᵃ bearing the adjusting block 59ᵃ′ to which is pivoted the jaw side member 60ᵃ by the pin 61ᵃ. The jaw closing member 63ᵃ is pivoted at 62ᵃ and is provided with the rollers which bear on the wear plates 64ᵃ′ and 65ᵃ′, just as in the case of the lower jaws. The operating lever 66ᵃ is pivoted at 67ᵃ and has the handle 68ᵃ and the roller 69ᵃ for contact with the wear plate 69ᵃ′ on the jaw closing member 63ᵃ. The operation and adjustment of the parts are the same as the lower jaws. To counter-balance the weight of the jaw side member 60ᵃ, there is provided the spring 70; and to counterbalance the weight of the jaw bottom member, there is provided the spring 71.

The novel coil end clamps will now be described and for a complete understanding of this part of the invention, reference is to be had to Figures 11 to 15 of the drawings. The clamp comprises the top 72 and the base 73, which may be formed integral with the standard or "kick up" arm 35, the sides 74 and 75, the jaws 76 and 77, pivoted to the sides 74 and 75 by the connecting links 78, the top being provided with groove 81 to receive the projections 82 on the sides 74 and 75, base 73 having similar grooves to receive the projections on the bottom of the sides 74 and 75, the top and base being provided with the slotted openings 79 through which pass the bolts 80 for clamping the sides 74 and 75 in adjusted position, and the guards 83 secured to the sides 74 and 75 by the screws 84. The faces of the jaws are covered with leather or rubber pads 85 to prevent the coil insulation from being torn or otherwise harmfully affected and also to increase the coefficient of friction between the coil and the clamp jaws. It will be understood that the clamp top 72 and the base 73 hold rigidly between them by means of the bolts 80 the clamp sides 74 and 75 in their adjusted position and that the jaws 76 and 77 are held together resiliently by the spring 85 connected to the pins 86 fixed to the links 78. Before the coil end is inserted in the clamp, the clamp jaws are opened by unhooking the spring 85 from one of the pins 86. Fig. 15 shows the position of the jaws and the links when the coil end is inserted in the clamp, the spring 85 having been again hooked on the pin 86 after the insertion of the coil. The connection of the jaws by the links 78 to the clamp sides causes the jaws to always assume and maintain a parallel relation. It will also be apparent that any pull by the coil on the clamps toward each other will serve to increase the hold of the clamp jaws on the coil ends. The guards 83 form a very important feature of the invention and assist the jaws of the clamp in holding the coil ends more securely. When the coil is being formed, the bottom part of the coil is bent around one guard and the top part of the coil is bent around another guard. If the stiffness of the coil is considered and likened to a lever, it will be apparent that the inside end of the guard constitutes a fulcrum with the load end of the lever between the jaws and tending to pull out the coil end which only serves to make the jaws hold the coil end more securely. Without the guards 83, the clamp jaw ends would act as fulcrums for the levers constituted by the coils but since the force on the fulcrum is greater than the force holding the jaws together, there is a tendency for the clamps to slip from the coils when the coil is nearly finished. As explained, the guards prevent the tendency of the clamps to slip off the coil end.

From the above description, it is understood that I have provided a coil forming apparatus that is accurate and rapid in operation. In practice, a table will be prepared to show how the jaws should be spaced, the clamp operating mechanism adjusted, and the stops set in order to form a coil of a predetermined size and of predetermined dimensions and form. In view of the preceding disclosure, certain changes will suggest themselves to those skilled in the art to which this invention appertains, but it is to be understood that this disclosure is not exhaustive of the means of embodying my invention in operative form and the invention is not to be limited except within the scope of the appended claims.

Having thus described my invention, what I claim and desire to secure by Letters Patent of the United States is:

1. In a machine of the class described, a stationary base, stationary jaws mounted thereon, a supporting frame, a lower shaft, means for revolvably supporting said lower shaft from said frame, an upper shaft, arms mounted on said lower shaft for revolvably supporting said upper shaft, jaws on said upper shaft, and means for revolvably moving said upper jaws and said shaft.

2. In a machine of the class described, a stationary base, jaws mounted thereon, a supporting frame, a lower shaft, means for revolvably supporting said lower shaft from said frame, an upper shaft, arms mounted on said lower shaft for revolvably supporting said upper shaft, means for revolvably moving said upper shaft and the jaws thereon, and means for limiting said revolvable movement to a predetermined extent.

3. In a machine of the class described, a stationary base, jaws mounted thereon, a lower and an upper shaft, means supporting said lower shaft for revolvable movement, means mounted on said lower shaft for supporting said upper shaft for revolvable movement, jaws on said upper shaft, and clamps pivotally and slidably mounted on the lower shaft.

4. In a machine of the class described, a stationary base, jaws mounted thereon, a supporting frame, arms pivotally connected thereto and depending therefrom to a point below the bottom of the jaws, a shaft pivotally mounted in said arms, arms rigidly mounted on said shaft, an upper shaft mounted in said last mentioned arms, jaws on said upper shaft, and stop members for limiting the movement of said arms and said shafts.

5. In a machine of the class described, a stationary base, jaws mounted thereon, a supporting frame, arms pivotally connected thereto and depending therefrom to a point below the said jaws, a shaft pivotally mounted in said arms, an upper shaft, jaws thereon, and arms rigidly mounted on said first mentioned shaft for pivotally supporting said upper shaft.

6. In a machine of the class described, a stationary base, jaws thereon, a supporting frame, arms pivotally connected to said frame and depending therefrom to a point below the jaws, a shaft mounted in said arms, standards pivotally and slidably mounted on said shaft, clamps secured to said standards, an upper shaft having jaws thereon, and arms rigidly mounted on said first mentioned shaft and pivotally supporting said upper shaft.

7. In a machine of the class described, a jaw member for holding a coil, comprising a relatively stationary member constituting one side and top of the jaw, a side member pivotally connected to said stationary member, and a bottom member pivotally connected to said stationary member.

8. In a machine of the class described, a jaw member, comprising a part constituting the side and top of the jaw, a side member pivoted to said part, a bottom member pivoted to said part, and means for moving said side and bottom members relatively to said first mentioned part.

9. In a machine of the class described, a jaw, comprising a relatively stationary member, a side member pivoted thereto, a bottom member pivoted to said stationary member, a lever pivoted to said first mentioned member and adapted to move said side and bottom members, and a lever pivoted to said stationary member for moving said first mentioned lever.

10. In a machine of the class described, a jaw, comprising a relatively stationary member constituting the side and top of the jaw, a side member pivotally and slidably connected to said stationary member, a bottom member pivotally and slidably connected to said stationary member, and means for moving said movable members with respect to said stationary member.

11. In a machine of the class described, a jaw, comprising a relatively stationary member constituting the side and top of the jaw, a side member slidably connected to said stationary member, a bottom member slidably connected to said stationary member, and means for moving said last mentioned members with respect to said stationary member.

12. In a machine of the class described, a clamp, comprising a top member, a bottom member, side members adjustably connected to said top and bottom members, jaws, means for pivotally connecting said jaws to said side members, a spring for forcing said jaws toward each other, and guards secured to said side members.

13. In a machine of the class described, a stop device, comprising a ring having an inner annular channel, an abutment having a lug portion extending into said annular channel and a portion fitting the periphery of the ring, and means for adjustably securing the abutment in relation to the ring.

14. In a machine of the class described, a stationary base, jaws thereon, an upper shaft, a lower shaft, jaws on said upper shaft, means for supporting said upper and lower shafts for revolvable movement, and counterweights for returning the upper shaft to its normal position.

15. In a machine of the class described, a stationary base, jaws thereon, an upper shaft having jaws thereon, a lower shaft, means for pivotally supporting said shafts for revolvable movement, counterweights for returning the upper shaft to its normal position, clamps pivotally and slidably mounted on said lower shaft, and counterweights for returning said clamps to a vertical position.

16. In a machine of the class described, a stationary base having jaws mounted thereon, an upper shaft having jaws mounted thereon, a lower shaft, clamps pivotally mounted on said lower shaft, and counterweights for returning said clamps to a vertical position.

In witness whereof, I hereunto affix my signature.

VICTOR T. MAVITY.